(12) United States Patent
Dobschal et al.

(10) Patent No.: US 10,007,119 B2
(45) Date of Patent: Jun. 26, 2018

(54) SPECTACLE LENS FOR A DISPLAY DEVICE THAT CAN BE FITTED ON THE HEAD OF A USER AND GENERATES AN IMAGE, AND DISPLAY DEVICE WITH SUCH A SPECTACLE LENS

(71) Applicant: Carl Zeiss Smart Optics GmbH, Aalen (DE)

(72) Inventors: Hans-Juergen Dobschal, Kleinromstedt (DE); Karsten Lindig, Erfurt (DE); Lisa Riedel, Jena (DE)

(73) Assignee: tooz technologies GmbH, Aalen (DE)

( * ) Notice: Subject to any disclaimer, the term of this patent is extended or adjusted under 35 U.S.C. 154(b) by 133 days.

(21) Appl. No.: 15/025,228

(22) PCT Filed: Sep. 25, 2014

(86) PCT No.: PCT/EP2014/070558
§ 371 (c)(1),
(2) Date: Mar. 25, 2016

(87) PCT Pub. No.: WO2015/044303
PCT Pub. Date: Apr. 2, 2015

(65) Prior Publication Data
US 2016/0266388 A1    Sep. 15, 2016

(30) Foreign Application Priority Data
Sep. 27, 2013    (DE) .......................... 10 2013 219 626

(51) Int. Cl.
*G02B 27/00* (2006.01)
*G02B 27/01* (2006.01)
(Continued)

(52) U.S. Cl.
CPC ........... *G02B 27/0172* (2013.01); *G02B 5/09* (2013.01); *G02C 7/086* (2013.01);
(Continued)

(58) Field of Classification Search
CPC .................. G02B 27/0172; G02B 5/09; G02B 2027/013; G02B 2027/011; G02B 2027/0178; G02C 7/086
See application file for complete search history.

(56) References Cited

U.S. PATENT DOCUMENTS

| 5,348,477 A | 9/1994 | Welch et al. |
| 5,803,673 A | 9/1998 | Reinsch et al. |

(Continued)

FOREIGN PATENT DOCUMENTS

DE    102011007812 A1    10/2012

OTHER PUBLICATIONS

International Preliminary Report on Patentability rendered by the International Bureau of WIPO for PCT/EP2014/070558, dated Mar. 29, 2016, 17 pages.

*Primary Examiner* — Joseph P Martinez
(74) *Attorney, Agent, or Firm* — Skaar Ulbrich Macari, P.A.

(57) ABSTRACT

A spectacle lens for a display device can be fitted on the head of a user and generate an image. A spectacle lens body includes a front side and/or the rear side that are curved, and at least a first and a second partial body, the mutually facing boundary surfaces of which are in direct contact, and as seen in top view onto the spectacle lens, a coupling-in section in an edge area of the spectacle lens and a coupling-out section in a central area of the spectacle lens. The spectacle lens can guide light bundles of pixels of the generated image to the coupling-out section and couple them out of the spectacle lens via the coupling-out section. A flat first reflecting surface and a flat second reflecting surface spaced apart from the first reflecting surface are provided in the spectacle lens body.

32 Claims, 14 Drawing Sheets

(51) Int. Cl.
*G02C 7/08* (2006.01)
*G02B 5/09* (2006.01)

(52) U.S. Cl.
CPC .. *G02B 2027/011* (2013.01); *G02B 2027/013* (2013.01); *G02B 2027/0178* (2013.01)

(56) References Cited

U.S. PATENT DOCUMENTS

| | | |
|---|---|---|
| 6,091,546 A | 7/2000 | Spitzer |
| 6,157,353 A | 12/2000 | Song et al. |
| 6,671,100 B1 | 12/2003 | McRuer |
| 6,825,987 B2 | 11/2004 | Repetto et al. |
| 7,577,326 B2 | 8/2009 | Amitai |
| 7,719,769 B2 | 5/2010 | Sugihara et al. |
| 8,456,744 B2 | 6/2013 | Dobschal et al. |
| 8,970,961 B2 | 3/2015 | Dobschal et al. |
| 2005/0073739 A1* | 4/2005 | Meredith ............. G02B 27/017 359/319 |
| 2006/0126181 A1 | 6/2006 | Levola |
| 2007/0008624 A1 | 1/2007 | Hirayama |
| 2007/0070859 A1* | 3/2007 | Hirayama ................ G02B 5/32 369/112.04 |
| 2010/0220295 A1 | 9/2010 | Mukawa et al. |
| 2013/0069260 A1* | 3/2013 | Buchon ............ B29D 11/00663 264/1.7 |

* cited by examiner

SPECTACLE LENS FOR A DISPLAY DEVICE THAT CAN BE FITTED ON THE HEAD OF A USER AND GENERATES AN IMAGE, AND DISPLAY DEVICE WITH SUCH A SPECTACLE LENS

PRIORITY

This application claims the benefit of German Patent Application No. 02013219626.1 filed on Sep. 27, 2013, which is hereby incorporated herein by reference in its entirety.

FIELD

The present invention relates to a spectacle lens for a display device that can be fitted on the head of a user and generates an image, and a display device with such a spectacle lens.

BACKGROUND

Spectacle lenses often comprise, seen in top view onto the spectacle lens, a coupling-in section in an edge area of the spectacle lens and a coupling-out section in a central area of the spectacle lens, wherein the spectacle lens is suitable for guiding light bundles of pixels of the generated image, which are coupled into the spectacle lens via the coupling-in section of the spectacle lens, in the spectacle lens to the coupling-out section and coupling them out of the spectacle lens via the coupling-out section. For guiding between the coupling-in and coupling-out section a total internal reflection at the front side and the rear side of the spectacle lens is often used, wherein, if the front and/or rear side is curved, aberrations such as astigmatism and coma can arise as a result of the oblique incidence on the curved surface caused by the total reflection. It does not matter whether the light is collimated or not before it enters the spectacle lens.

In principle it is possible to compensate for these aberrations by means of a corresponding formation of the coupling-in and/or coupling-out section. However, this is extremely complex because, for each differently curved front and/or rear side, the necessary correction would have to be calculated and the corresponding spectacle lens individually produced. This would lead to a very high cost as well as to a very high logistical outlay.

SUMMARY

An object of the invention is to provide a spectacle lens for a display device that can be fitted on the head of a user and generates an image, and to overcome the difficulties named above as completely as possible.

The disclosure includes a spectacle lens for a display device that can be fitted on the head of a user and generates an image, wherein the spectacle lens comprises a spectacle lens body comprising a front side and a rear side, wherein the front side and/or the rear side is/are curved and the spectacle lens body comprises at least a first and a second partial body, the mutually facing boundary surfaces of which are in direct contact, wherein, seen in top view onto the spectacle lens, a coupling-in section is provided in an edge area of the spectacle lens and a coupling-out section is provided in a central area of the spectacle lens, wherein the spectacle lens is suitable for guiding light bundles of pixels of the generated image, which are coupled into the spectacle lens via the coupling-in section of the spectacle lens, in the spectacle lens to the coupling-out section and coupling them out of the spectacle lens via the coupling-out section, wherein a flat first reflecting surface and a flat second reflecting surface spaced apart from the first reflecting surface are provided in the spectacle lens body, which extend, in each case, in a direction from the coupling-in section to the coupling-out section and which are, in each case, spaced apart from the front and rear side of the spectacle lens body, wherein the light bundles are guided by means of reflections at the two reflecting surfaces in the direction from the coupling-in section to the coupling-out section and wherein at least one of the first and second reflecting surfaces is provided in the first or second partial body and spaced apart from the boundary surface of the corresponding partial body. Thus, the corresponding reflecting surface is arranged offset with respect to the boundary surface of the corresponding partial body in the direction from the one partial body to the other. The corresponding reflecting surface can also be referred to as a reflecting surface buried in the corresponding partial body.

Since the guidance of the light bundles from the coupling-in section to the coupling-out section takes place via the two flat reflecting surfaces and thus independently of the front and rear side, the light guiding can be handled optically independently of the front and rear side. Thus the coupling-out and/or coupling-in section in conjunction with the two reflecting surfaces can be designed in the desired manner independently of the curvature of the rear side. It is thus possible to handle even various spectacle lenses which correct different vision defects in the same way with respect to the guidance of light bundles and coupling-out of the light bundles.

In addition, undesired aberrations (e.g. astigmatism and coma) which can arise during the guiding between the coupling-in and the coupling-out section can be minimized.

The first reflecting surface can be provided in the first partial body and spaced apart from the boundary surface of the first partial body and the second reflecting surface can be provided in the second partial body and spaced apart from the boundary surface of the second partial body. Alternatively, it is possible for the first reflecting surface to be provided in the first partial body and spaced apart from the boundary surface of the first partial body and for the second reflecting surface to be formed at the boundary surface of the second partial body.

Since the spectacle lens body comprises at least the first and second partial body, the reflecting surfaces can be easily produced and the two partial bodies can then be connected to each other in order to obtain the desired spectacle lens.

The coupling-out section can comprise a pupil expander for the light bundles. It is thus possible to provide a large exit pupil for a user.

In particular, the first and second reflecting surfaces are parallel to each other.

The coupling-out section can comprise a first deflecting section with a reflective Fresnel structure which deflects the light bundles in the direction to the rear side such that they are coupled out via the rear side. In particular, the Fresnel structure can comprise several reflective facets which are arranged next to each other in a direction from the edge area to the central area. The facets can be partially reflective facets or also purely reflective facets (where possible with a reflection of 100%). In addition, the facets can be arranged (laterally) next to each other without interspaces (in top view onto the facets they thus form a coherent surface) or interspaces can be provided (in top view onto the facets the interspaces are then visible).

In particular, the transparency of the facets can decrease in the direction from the edge area to the central area (and thus the reflectivity can increase in this direction).

Furthermore, in each case two directly neighbouring facets can be connected by a transparent or partially transparent face.

The first reflecting surface can extend into the coupling-out area, wherein the Fresnel structure lies in front of the first reflecting surface, seen in the direction of the light bundles striking the first reflecting surface. In particular, in this case, the facets can be formed on the first reflecting surface, with the result that a flat Fresnel structure is present. Furthermore, the area between the facets and the first reflecting surface can be filled with a material which corresponds to the material of the partial body in which the first reflecting surface lies. The facets can thus also be referred to as buried facets. This formation achieves the advantage that the portion of the light bundles which is not reflected but is transmitted by the respective facet reflects at the first reflecting surface in the direction of the second reflecting surface and is in turn deflected by this onto the facets (laterally spaced apart facets relative to the previous coupling-out). The desired enlargement of the exit pupil is thus achieved.

The second reflecting surface can extend into the coupling-out area, wherein the Fresnel structure lies in front of the second reflecting surface, seen in the direction of the light bundles striking the second reflecting surface.

The first and the second reflecting surfaces can be formed by boundary surfaces of a guide plate which is inserted in the first and/or second partial body. An element can thereby be provided which provides the desired light guiding and coupling-out for the most varied spectacle lenses. In particular, the guide plate comprises the Fresnel structure for coupling out the light bundles. In addition, the guide plate can also comprise a refractive and/or reflective coupling-in optical system which deflects the light bundles striking it such that they are guided from the two reflecting surfaces to the coupling-out section.

Furthermore, it is possible for the first and/or second reflecting surface to be formed (directly) in the first and/or second partial body.

By a facet is meant, in particular, a piece of surface, a surface element or a surface. The piece of surface, the surface element or the surface can provide the described optical effect of the facet.

The disclosure also includes a display device that can be fitted on the head of a user and generate an image, wherein the spectacle lens comprises a spectacle lens body comprising a front side and a rear side, wherein the front side and/or the rear side is/are curved and the spectacle lens body is formed in one piece, and wherein, seen in top view onto the spectacle lens, a coupling-in section is provided in an edge area of the spectacle lens and a coupling-out section is provided in a central area of the spectacle lens, wherein the spectacle lens is suitable for guiding light bundles of pixels of the generated image, which are coupled into the spectacle lens via the coupling-in section of the spectacle lens, in the spectacle lens to the coupling-out section and coupling them out of the spectacle lens via the coupling-out section, wherein a flat first reflecting surface and a flat second reflecting surface spaced apart from the first reflecting surface are provided in the spectacle lens body, which extend, in each case, in a direction from the coupling-in section to the coupling-out section and which are, in each case, spaced apart from the front and rear side of the spectacle lens body, wherein the light bundles are guided by means of reflections at the two reflecting surfaces in the direction from the coupling-in section to the coupling-out section.

By means of the two flat reflecting surfaces, the light guiding can be carried out independently of the curvature of the rear side, with the result that, on the one hand, undesired aberrations during the light guiding can be minimized and, on the other hand, a light guiding can be provided independently of the curvature of the front and rear side.

The first and second reflecting surfaces can be formed by boundary surfaces of a guide plate which is inserted in the one-piece spectacle lens body. In particular, the one-piece spectacle lens body can comprise an end face which connects the front and rear sides and from which a recess extends into the spectacle lens body, wherein the guide plate is positioned in the recess.

In the coupling-out section, the guide plate can comprise a first deflecting section with a reflective Fresnel structure which deflects the light bundles in the direction of the rear side such that they are coupled out via the rear side.

The Fresnel structure of the first deflecting section can comprise several reflective facets which are arranged next to each other in a direction from the edge area to the central area. The reflective facets can be arranged spaced apart from each other (in top view gaps can be seen) or without a space (in top view the reflective facets form a continuous surface).

The facets can be formed as partially reflective facets or as purely reflective facets (where possible with a reflection of 100%). The transparency of the partially reflective facets can decrease in the direction from the edge area to the central area (and thus the reflectivity increases in this direction).

It is possible for, in each case, two directly neighbouring facets to be connected by a transparent face or a partially transparent face.

Furthermore, the area between the facets and the first reflecting surface can be filled with material of the guide plate such that the first reflecting surface is formed as a smooth surface in the area of the facets.

The first and/or second reflecting surface can bring about the reflection of the light bundles by means of total internal reflection.

Alternatively, it is possible for the first and/or second reflecting surface to be formed by a reflecting layer. This reflecting layer can be a single layer or also a layer system.

Furthermore, a second deflecting section which deflects the light bundles such that they are guided to the coupling-out section by reflection at the first and second reflecting surface can be provided in the area of the coupling-in section.

Furthermore, the coupling-in and/or coupling-out section can have an imaging effect. Moreover, the coupling-in section can have a collimation effect. The coupling-in section can, furthermore, be refractive and/or reflective.

The guide plate can project laterally beyond the spectacle lens body, wherein the coupling-in section is formed in the projecting part of the guide plate.

The facets are preferably formed such that they do not generate a desired diffractive effect.

The disclosure further includes a display device, including a holder that can be fitted on the head of a user, an image-generating module secured to the holder, which generates an image, and an imaging optical system secured to the holder, which comprises a spectacle lens according to the invention and which, when the holder is fitted on the head, images the generated image such that the user can perceive it as a virtual image.

The imaging optical system can comprise the spectacle lens as the only optical element. However, it is also possible for the imaging optical system to comprise, in addition to the spectacle lens, also at least one further optical element.

Thus, the further optical element can be e.g. a collimation optical system which is arranged between the spectacle lens and the image-generating module, with the result that the light bundles from the image-generating module are coupled into the spectacle lens as collimated bundles.

The image-generating module can, in particular, comprise a two-dimensional imaging system, such as e.g. an LCD module, an LCoS module, an OLED module or a tilting mirror matrix. The imaging system can be self-luminous or not self-luminous.

The image-generating module can, in particular, be formed such that it generates a monochromatic or a multi-coloured image.

The display device according to the invention can comprise further elements known to a person skilled in the art which are necessary for its operation.

It is understood that the features named above and those yet to be explained below can be used not only in the stated combinations but also in other combinations or alone, without departing from the scope of the present invention.

Figure 1:
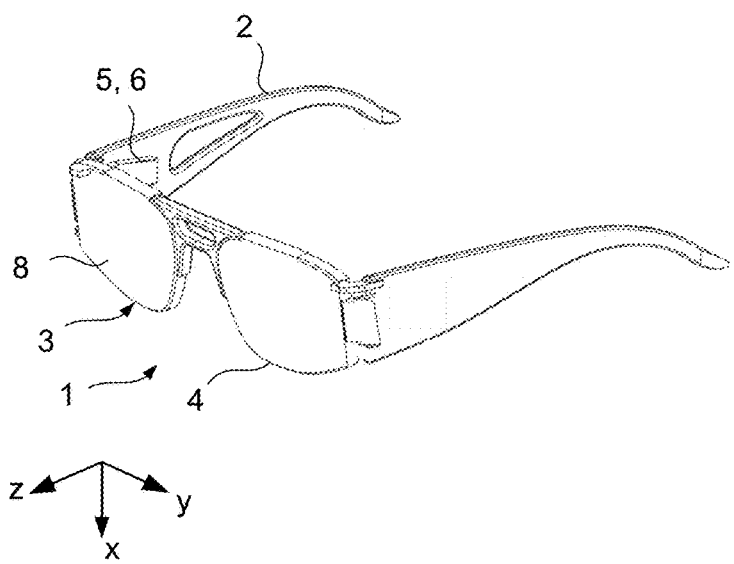
FIG. 1 is a schematic perspective representation of an embodiment of the display device according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1 the display device 1 according to the invention comprises a holder 2 that can be fitted on the head of a user and can be formed e.g. in the manner of a conventional spectacles frame, as well as a first and a second spectacle lens 3, 4, which are secured to the holder 2. The holder 2 with the spectacle lenses 3 and 4 can be formed e.g. as sports glasses, sunglasses and/or glasses for correcting defective vision, wherein a virtual image can be reflected into the user's field of view via the first spectacle lens 3, as described below.

The spectacle lenses 3, 4, and in particular the right-hand spectacle lens 3, are only described together with the display device 1 according to the invention by way of example. The spectacle lenses 3, 4, or at least the right-hand spectacle lens 3, are in each case formed separately as a spectacle lens 3, 4 according to the invention. The right-hand spectacle lens 3 according to the invention can, naturally, also be formed as the left-hand spectacle lens.

Figure 2:
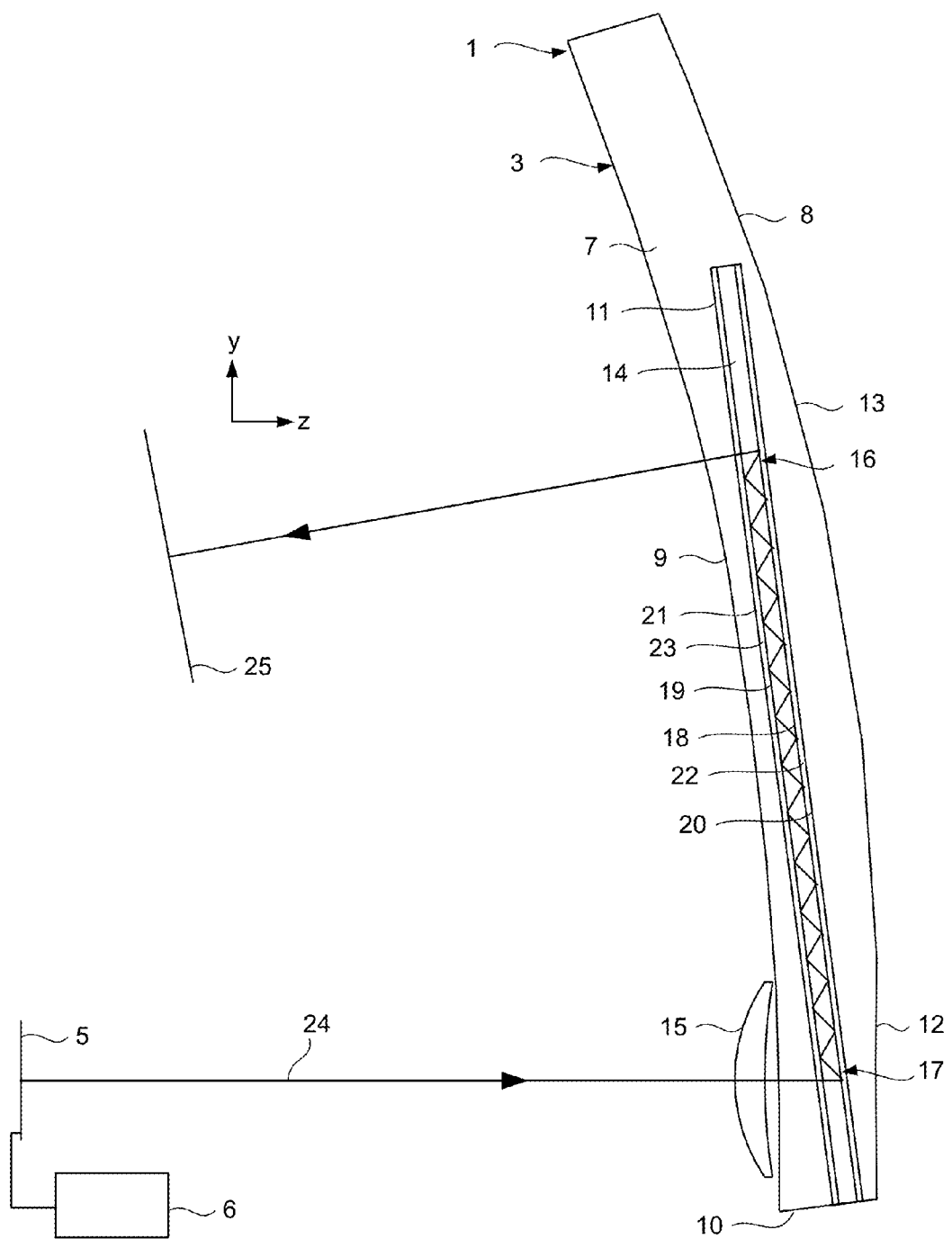
FIG. 2 is a detailed sectional view of the first spectacle lens from FIG. 1.

As can best be seen from the detailed sectional view of the first (right-hand) spectacle lens 3 in FIG. 2 (the holder 2 is not represented), the display device 1 comprises an image-generating module 5, a control unit 6 and an coupling-in optical system 15. The image-generating module 5, the control unit 6 and the coupling-in optical system 15 are represented purely schematically and are preferably secured to the holder 2. The image-generating module 5 can comprise e.g. a two-dimensional light modulator (such as e.g. an OLED, CMOS or LCoS chip or a tilting mirror matrix) with a plurality of pixels e.g. arranged in columns and rows. A light bundle 24 can emerge from each pixel.

The right-hand spectacle lens 3 comprises a one-piece spectacle lens body 7 with a spherically curved front side 8, a curved rear side 9 and an end face 10. Since the spectacle lens 3 serves to correct defective vision in the embodiment example described, the curvature of the rear side 9 is chosen such that the desired correction of defective vision is present. The spherical curvature of the front side 8 can then correspond to a standard radius which arises in dependence on the necessary correction of the rear side (dioptre number).

As can be seen in FIG. 2, the spectacle lens body 7 comprises a slit-shaped recess 11 which extends from the end face 10 and thus from an edge area 12 of the spectacle lens to a central area 13.

In the recess 11, a plane-parallel guide plate 14 is inserted which serves to guide the image generated by the image-generating module 5 (and thus the light bundles 24 emerging from each pixel) from the edge area 13 to the central area 12 and to couple it out there such that a user wearing the display device 1 can perceive it as a virtual image (preferably superimposed with the surroundings).

For this, the guide plate 14 comprises a first and second deflecting section 16, 17 and is inserted into the recess 11 such that a first side 18 of the guide plate 14 is spaced apart from the opposite first wall surface 20 of the recess 11 and a second side 19 of the guide plate 14 is spaced apart from the opposite second wall surface 21 of the recess 11, respectively. Thus, on both sides 18, 19 of the plane-parallel guide plate 14, respectively, an air gap 22, 23 is present which is used to guide the image coming from the image-generating module 5 (or the corresponding light beams or light bundles 24 of the pixels of the image) between the second and the first deflecting section 16, 17 by means of total internal reflection at the first and second side 18, 19. The two sides 18, 19 thus form a flat reflecting surface between the two deflecting sections 16, 17, respectively.

In FIG. 2, a light beam 24 is drawn in schematically which strikes the second deflecting section 17 (which can also be referred to as coupling-in section) of the guide plate 14 from the image-generating module 5 via the coupling-in optical system 15 and is deflected there such that it is guided by means of total internal reflection at the first and second side 18, 19 to the first deflecting section 16 (which can also be referred to as coupling-out section). At the first deflecting section 16, the light beam 24 is deflected in the direction of the pupil of the eye of a user wearing the display device 1, with the result that the light beam 24 exits the spectacle lens body 7 through the side 19 of the guide plate (because of the small angle of incidence present due to the deflection total internal reflection no longer takes place at the side 19) and via the rear side 9 and can then be detected by the eye of the user in the area 25.

Figure 3:
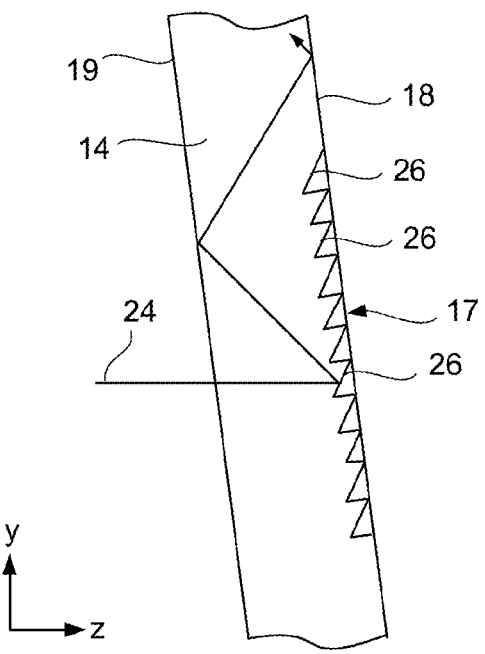
FIG. 3 is an enlarged sectional view of the guide plate in the area of the coupling-in section.

In FIG. 3, the second deflecting section 17 is represented schematically in an enlarged detailed view of the guide plate 14. The second deflecting section 17 comprises a plurality of reflective facets 26 which deflect the incident light 24 such that it can then be guided by means of total internal reflection at the two sides 19 and 18 to the first deflecting section 16. In the embodiment shown in FIG. 3, the depressions present by means of the facets 26 are filled with the material of the guide plate 14, with the result that the first side 18 is also formed flat in the area of the second deflecting section 17. The facets 26 can also be referred to as buried facets.

Figure 4:
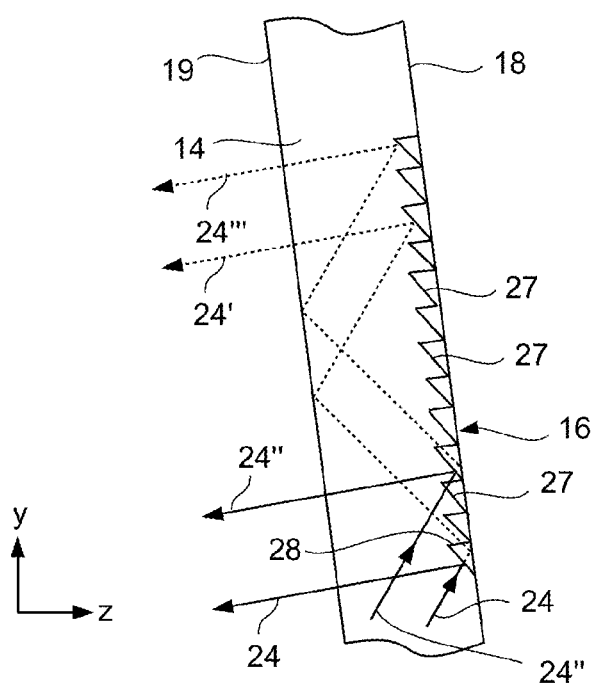
FIG. 4 is an enlarged sectional view of the guide plate in the area of the coupling-out section.

In FIG. 4, the first deflecting section 16 is represented schematically in an enlarged detailed view. The first deflecting section 16 comprises a plurality of partially reflective facets 27, wherein in each case two directly neighbouring partially reflective facets are connected by a face 28. The face 28 can be reflective. However, it is preferably partially reflective or transparent.

For the light beam 24, the deflection at a facet 27 is represented schematically. Because of the partially reflective formation of the facets 27, the portion 24' which is not reflected at the facet 27 (represented by a dashed line) is transmitted, strikes the first side 18, at which total internal reflection takes place, runs through the face 28, with the result that it strikes a further facet 27 after another total internal reflection at the second side 19 and is deflected to the area 25.

It is also possible for the portion transmitted by a facet 27 to run through the face 28 and strike the next facet 27 and to be reflected by the latter and thereby coupled out (light beam 24"). At this next facet 27, of course, a portion of the light beam 24" is again also transmitted, which is reflected at the first side 18 by means of total internal reflection, strikes the second side 19 and, after another total internal reflection at the second side 19, strikes a further facet 27 and is deflected by it to the area 25 (light beam 24''').

By means of this type of multiple coupling-out at laterally offset locations, a so-called pupil expander is realized, with the result that, in the area 25, a large exit pupil or a large eyebox (the area which is provided by the display device 1 and in which the user's eye can move and he can still always perceive the coupled-out image) is provided.

In order to realize this multiple coupling-out, in the first deflecting section 16, the depressions present by means of the facets 27 are filled with the material of the guide plate 14 such that the first side 18 is flat in the area of the first deflecting section 16. By this means, the desired total reflection of the light transmitted by the facets 27 can be achieved at the first side 18. The facets 27 can be referred to as buried facets.

In order to achieve a uniform brightness in the eyebox, the partially reflective facets 27 are formed such that their transparency decreases in the direction from the second to the first deflecting section 17, 16 (i.e. in FIG. 4 from bottom to top) and thus their reflectivity increases in this direction.

In the embodiment described here, the first and second side 18, 19 are spaced apart from each other by 0.8 mm. In order to obtain an eyebox with a lateral dimension (i.e. in the y direction) of 10 mm in the case of a field of view of 15°×10°, five to nine horizontal couplings-out are required depending on the position of the field points or pixels of the centre of the image generated by the image-generating module 5.

Here, the length of the guide plate is 20 to 25 mm (extent in the direction from the second deflecting section 17 to the first deflecting section 16) and the width of the two air gaps 22, 23 is 0.1 mm in each case. The spectacle lens 3 has a thickness of 3.5 mm in the case of a radius of the front side 8 of 90 mm.

Because of the very thin plate 14, a bundle diameter of a single coupling-out is not sufficient to fill the eyebox 25 in the lateral direction. For each field point, therefore, for example two or three neighbouring couplings-out are necessary in order to fill the pupil of the user's eye positioned in the eyebox 25. These e.g. two or three couplings-out are therefore to be imaged onto the same image point (lying within the resolution of the eye) on the retina. Congruence is thus to be present. By this is meant in particular that, within the framework of a resolution of the eye of less than 1 min, the same location on the retina is struck. It can also be said that the same main beam angle is present for these neighbouring couplings-out for one field point.

This can be achieved in that the partially reflective facets 27 not only have a purely beam-deflecting property but also have an imaging function. This can be easily determined by means of an optimization calculation. A curved reflective surface is used as a starting point, which is then approximated by the partially reflective facets 27. The individual facets 27 can be flat or curved. Such a procedure is described for example in WO 2010/097442 A1 and in WO 2010/097439 A1, wherein the corresponding description, together with the figures, of these published documents is hereby incorporated in the present disclosure.

In order to achieve a superimposition of the virtual image presented to the user with the surroundings which is as good as possible, the light beams 24, 24', 24", 24''', after the deflection at the first deflecting section 16, have the directions as if they had passed through the spherical front side 8. After the deflection at the first deflecting section 16, the light beams 24, 24', 24", 24''' thus have the effect of the spherical front side 8. This can be realized, for example, by a corresponding design of the first and/or second deflecting section 16, 17. It is also possible to support this effect by means of a corresponding design of the coupling-in optical system 15.

Since the corrections of defective vision for the user in observing the surroundings are produced by the curvature of the front and rear side 8, 9 and the light beams 24, 24', 24", 24''' deflected at the first deflecting section 16 also run through the rear side 9, these are corrected for the user in the same way as the light beams of the surroundings. The user can thus perceive both the surroundings and the reflected-in virtual image sharply.

Because, in the case of the spectacle lens 3 according to the invention or the display device 1 according to the invention, the image is not guided by means of reflection at the front and/or rear side 8, 9, this guiding can be handled independently of the specific formation of the rear side 9. This leads, on the one hand, to the advantage that it is easier to avoid imaging errors. On the other hand, the same guide plate 14 can be used for different spectacle lenses 3 (in particular for spectacle lenses 3 which differ in terms of the correction of defective vision) without amendment. The original spectacle lens can be used with its normal thickness. In case its normal thickness is not sufficient, only a relatively small spare thickness (approx. 1 mm) needs to be provided for the guide plate 14 including the two air gaps 22, 23.

Figure 5:
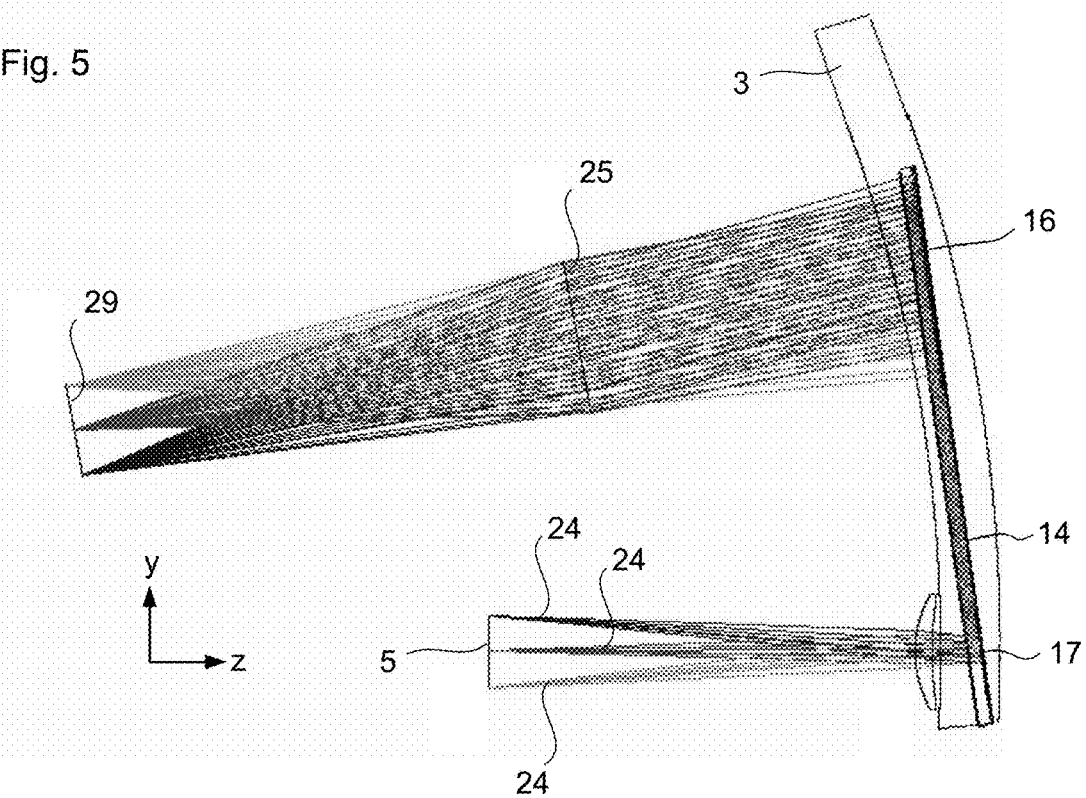
FIG. 5 is a schematic sectional view of the first spectacle lens.

In FIG. 5, in a similar way to in FIG. 2, the spectacle lens 3 together with the image-generating module 5 and control unit 6 is represented in a sectional view, wherein, however, the position 29 of the retina of an eye of a user wearing the display device is also drawn in schematically and nine couplings-out are shown.

Figure 6:
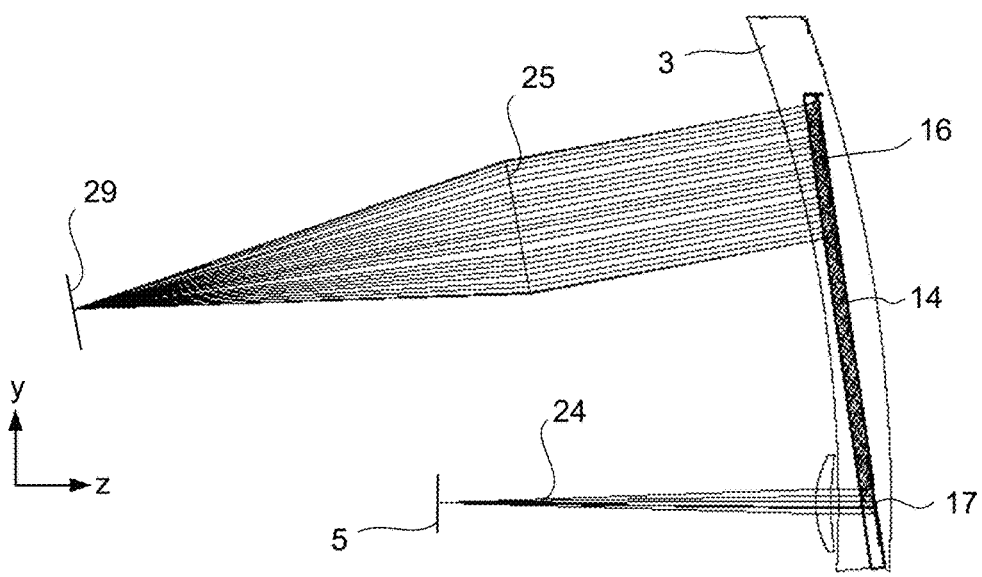
FIGS. 6 to 8 are sectional views of the spectacle lens to explain the illumination in the exit pupil.

To illustrate the nine couplings-out, in FIG. 6, all active couplings-out for an image point of the generated image are represented in the field centre with a full eyebox 25 with the extent of 10 mm in the y direction.

Figure 7:
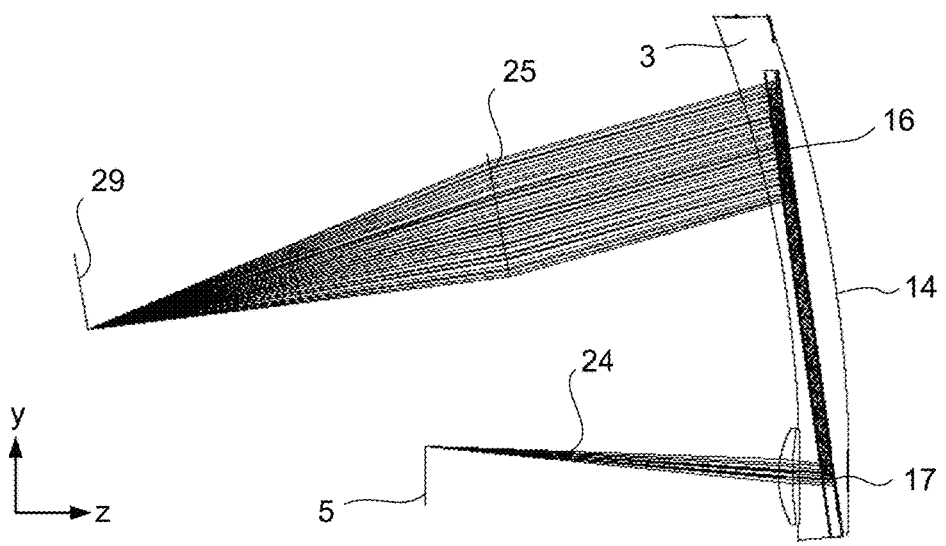
Figure 8:
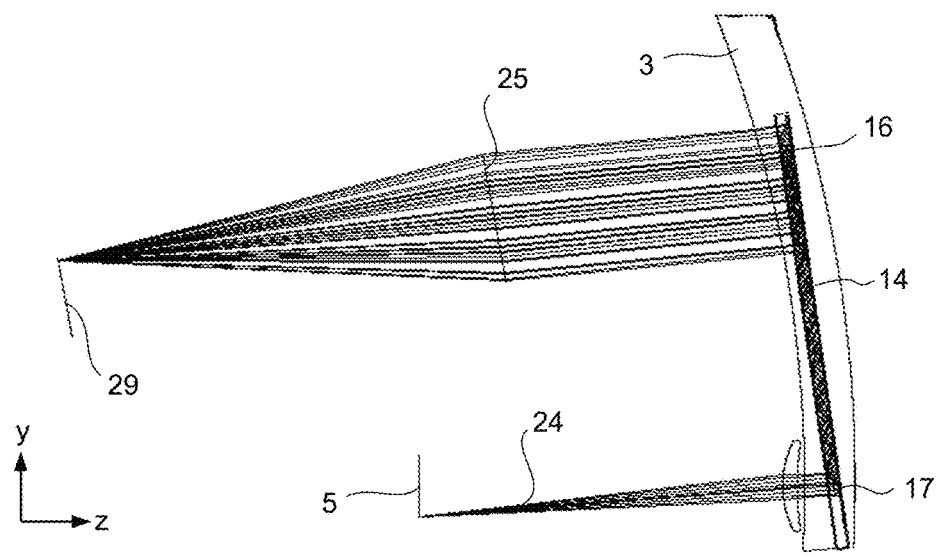

In FIGS. 7 and 8, all active couplings-out for a point of the lower field edge or for a point of the upper field edge, respectively, are shown in each case again with a full eyebox 25.

Figure 9:
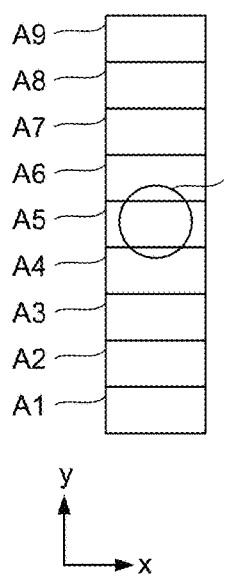
FIGS. 9-11 are top views of the coupled-out light bundles for different field points with the pupil of the eye in the same position.
Figure 10:
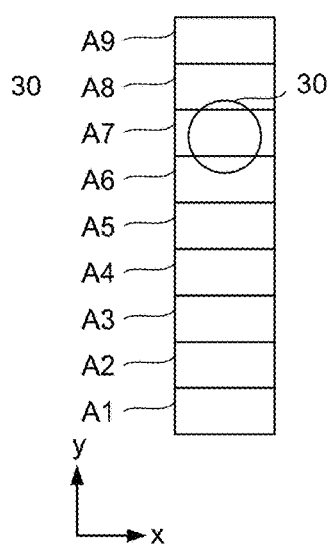
Figure 11:
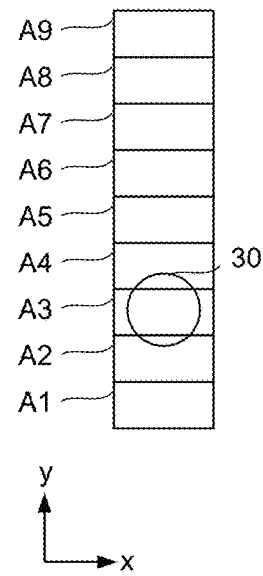

In FIG. 9, the illumination of the pupil of the eye 30 is shown, wherein the starting point here is a diameter of the pupil of the eye of 3 mm. Here, the couplings-out nos. 4, 5 and 6 account for the field centre when the pupil of the eye 30 is positioned in the centre of the eyebox (the first to ninth couplings-out are labelled with A1-A9). For the two field edges, the couplings-out 6 to 8 or 2 to 4 are relevant when the pupil of the eye 30 lies in the centre of the eyebox, as is shown in FIGS. 10 and 11.

Figure 12:
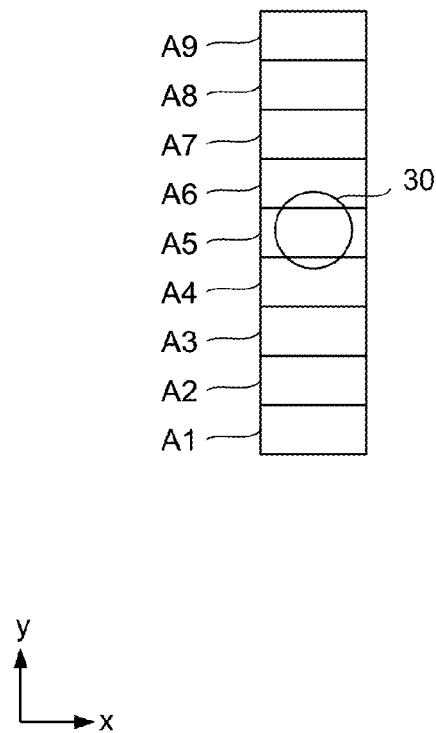
FIGS. 12 and 13 are top views of the coupled-out light bundles for different field points with the pupil of the eye in the same position.
Figure 13:
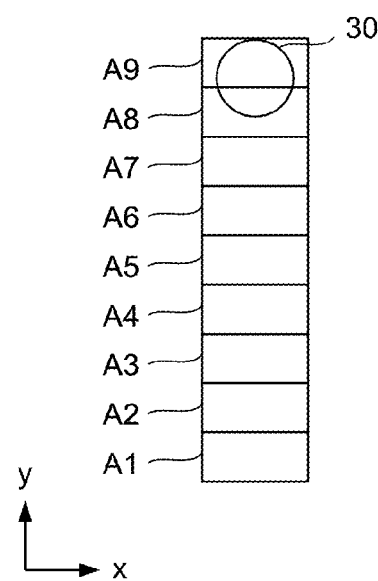
Figure 14:
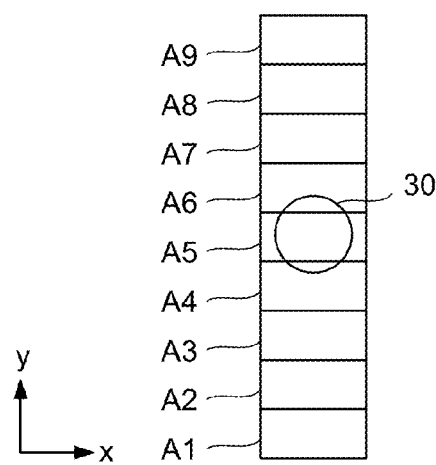
FIGS. 14 and 15 are top views of the coupled-out light bundles for different field points with the pupil of the eye in the same position.
Figure 15:
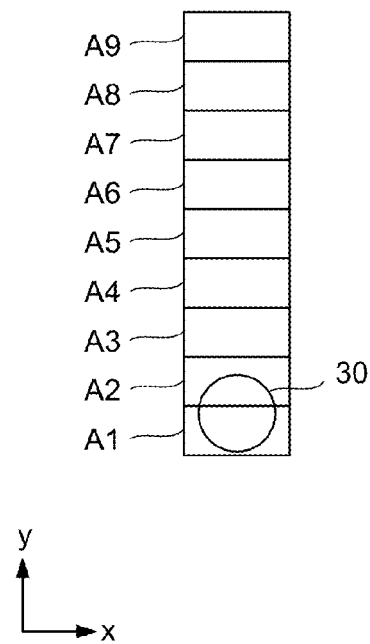

When the pupil of the eye lies at the upper edge of the eyebox (i.e. is decentred by +3.5 mm), the couplings-out 4 to 6 or 8, 9 are relevant for the illumination for the two field edges, as is shown in FIGS. 12 and 13. When the pupil of the eye is decentred by −3.5 mm, the couplings-out 4 to 6 or 1 and 2 account for the two field edges, as is shown in FIGS. 14, 15.

In the case of the embodiment described hitherto, the image is guided into the guide plate 14 by means of total internal reflection at the first and second side 18, 19. Of course, it is also possible to provide the first and second side 18, 19 with a reflective or partially reflective layer. In particular, a layer system can be provided which adjusts the effect of the total internal reflection in such a way that the layer acts transmissively up to a predetermined angle of incidence and the layer acts reflectively after the predetermined angle of incidence. Such a reflective layer or such a reflective layer system 31, 32 is represented hatched in FIG. 16. In a further alternative embodiment, the reflective layer or the reflective layer system 31, 32 can also be formed on the first and second wall surface 20, 21.

Figure 17:
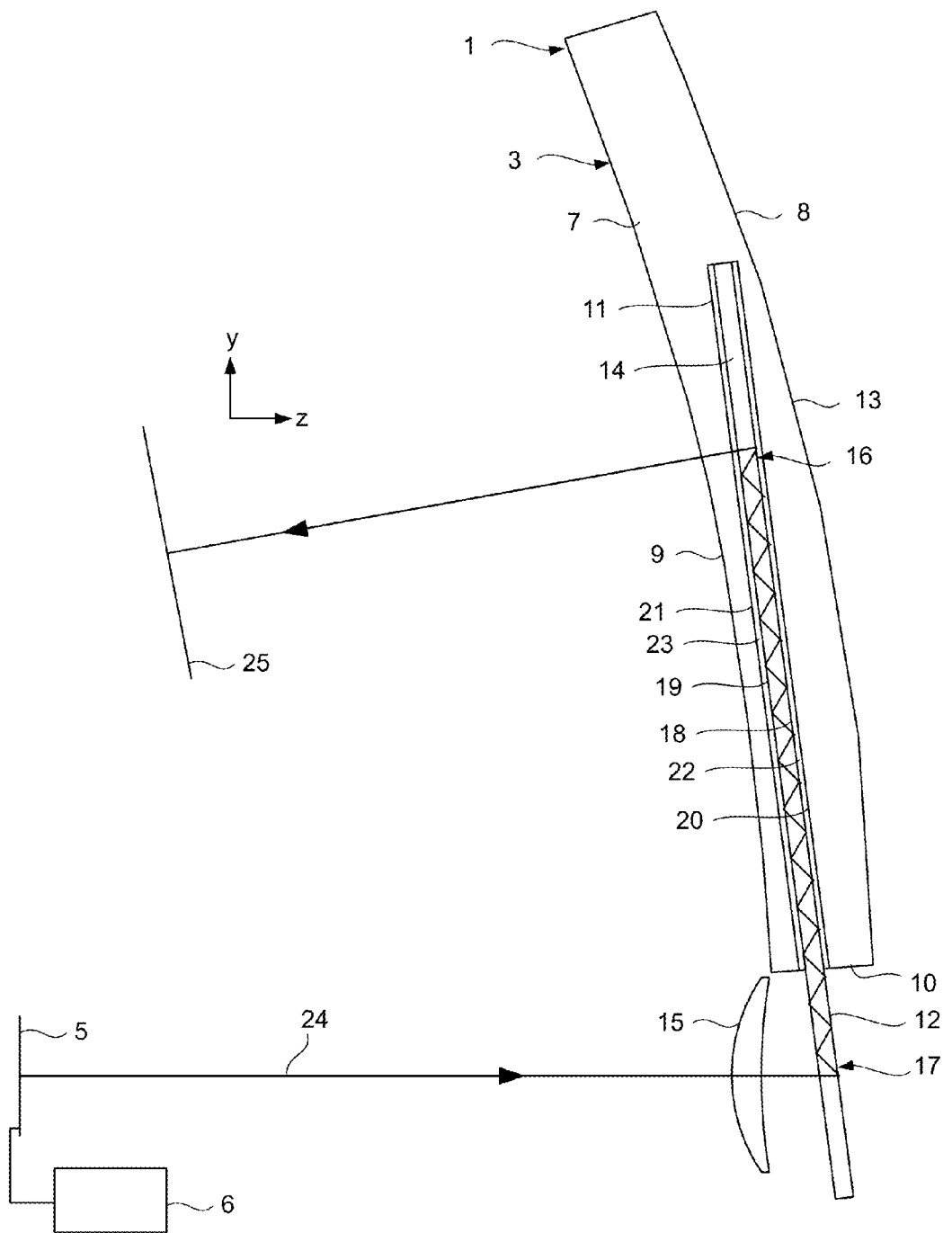
FIG. 17 is a sectional view of the right-hand spectacle lens according to a further embodiment.

In FIG. 17, a further modification of the embodiment of the display device 1 according to the invention according to FIGS. 1 to 15 is represented. In this embodiment shown in FIG. 17, the guide plate 14 projects beyond the end face 10, with the result that the second deflecting section 17 lies outside the spectacle lens body 7. Thus, the light 24 does not need to be guided through the curved rear side 9 for coupling into the guide plate 14. This makes the coupling-in easier because the effect of the curved rear side 9 no longer needs to be taken into account.

Figure 16:
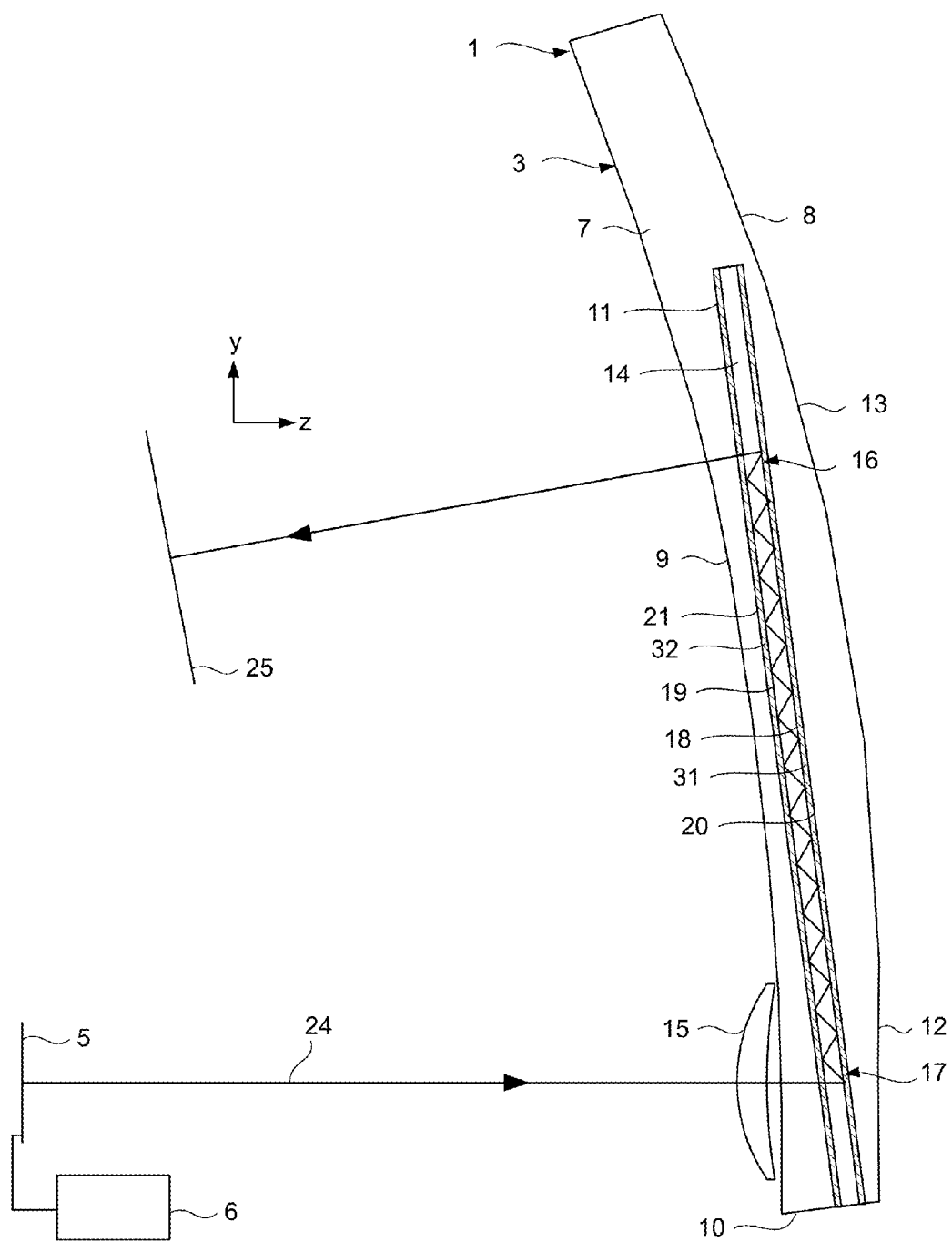
FIG. 16 is a sectional view of the right-hand spectacle lens according to a further embodiment.
Figure 18:
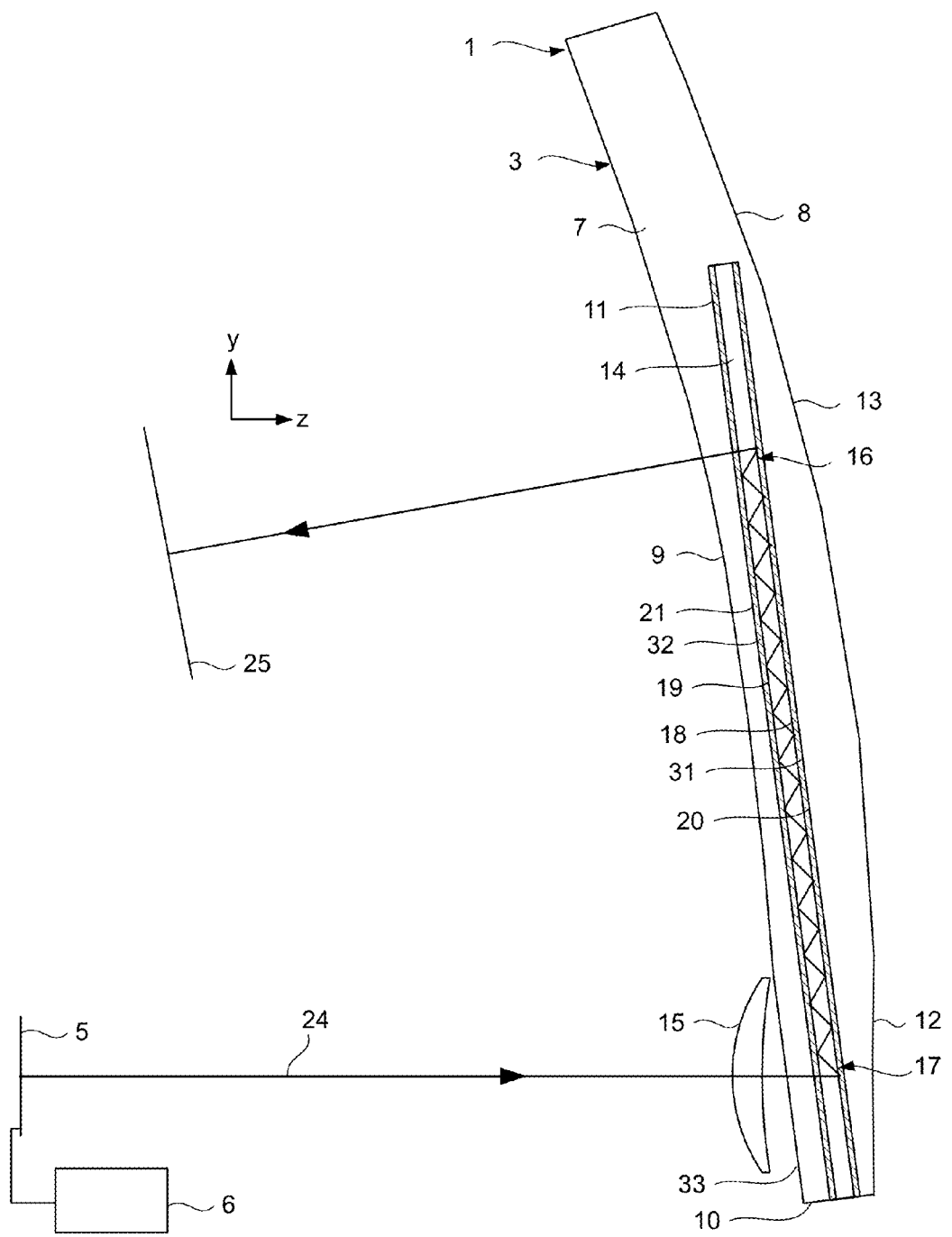
FIG. 18 is a sectional view of the right-hand spectacle lens according to a further embodiment.

In FIG. 18, a modification of the embodiment according to FIG. 16 is shown. Here, the area of the rear side 9, via which the coupling-in to the guide plate 14 takes place, is formed as a flat area 33. The curvature of the rear side 9 thus no longer needs to be taken into account in the coupling-in. The area 33 of the rear side 9, via which the coupling-in to the guide plate takes place, does not need to be flat but can have any desired shape. Of course, it is also possible e.g. to form the coupling-in optical system 15 integrally as area 33.

In the embodiments described hitherto the spectacle lens body 7 is always formed in one piece. The slit-shaped recess 11 can be formed, for example, using material-removing processing through the end face 10. The guide plate 14 can also be referred to as insertion plate which is inserted into the recess 11 via the opening in the end face 10. It can then be connected (e.g. adhesively bonded) to the spectacle lens carrier e.g. in the area of the opening in the end face 10 and in the area of the end facing away from the end face 10.

Figure 19:
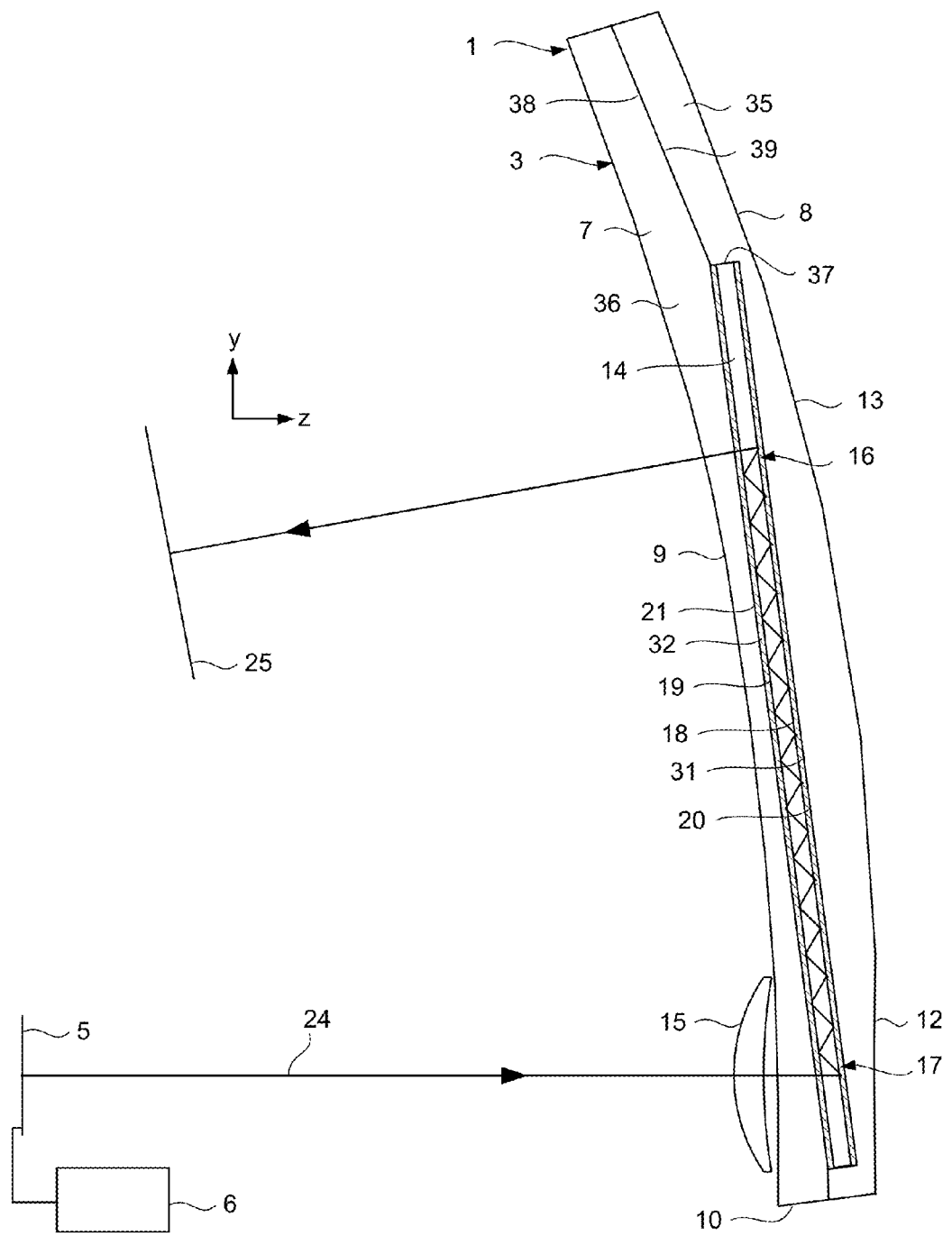
FIG. 19 is a sectional view of the right-hand spectacle lens according to a further embodiment.

In FIG. 19, an embodiment of the display device 1 according to the invention or of the spectacle lens 3 according to the invention is shown in which the spectacle lens body 7 is formed of two partial bodies 35 and 36. The two partial bodies 35 and 36 are connected to each other, wherein the partial body 35 comprises a recess 37 for receiving on the guide plate 14.

Figure 20:
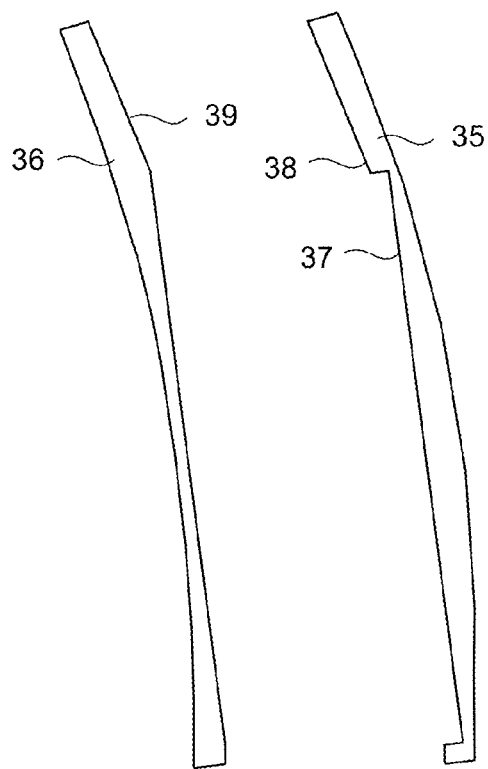
FIG. 20 is a sectional view of the two partial bodies according to FIG. 19.

In FIG. 20, the two partial bodies 35 and 36 are represented as separate parts. The first partial body 35 comprises a first boundary surface 38 facing the second partial body 36. The recess 37 is formed in the first boundary surface 38. The second partial body 36 comprises a second boundary surface 39 facing the first partial body 35. This boundary surface 39 is formed flat in the area of the guide plate 14 which is to be arranged.

To produce the spectacle lens 3 according to FIG. 19, the guide plate 14 is inserted into the recess 37 (FIG. 21) and the two partial bodies 35 and 36 are then connected to each other. This is carried out in such a way that the two boundary surfaces 38 and 39 are then in direct contact. For example, the two boundary surfaces 38 and 39 can be cemented to each other.

Figure 21:
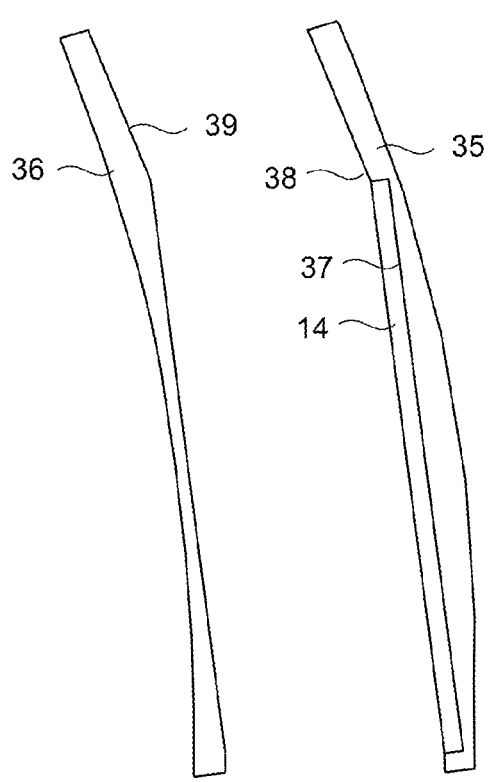
FIG. 21 is a sectional view of the two partial bodies with inserted guide plate.
Figure 22:
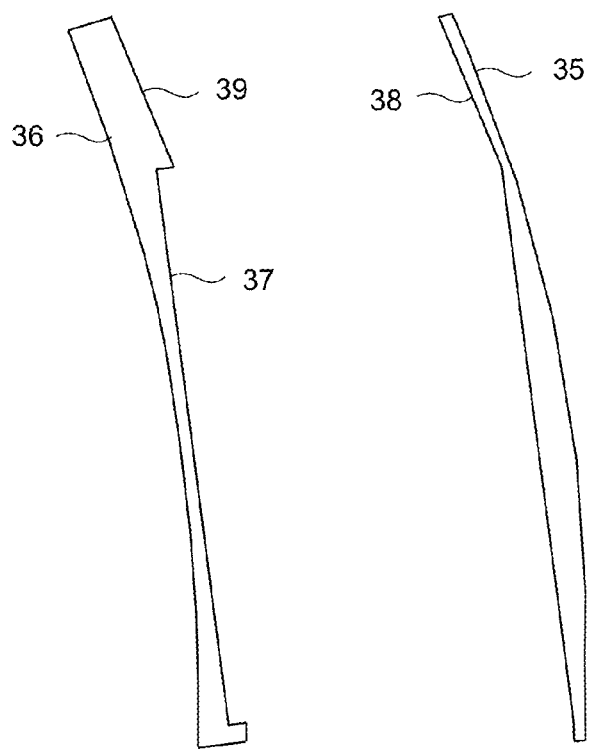
FIG. 22 is a variant of the two partial bodies according to FIG. 20.

In FIG. 22, a modification of the two partial bodies 35, 36 according to FIG. 21 is shown. In this modification, the recess 37 for the guide plate 14 is formed in the second partial body 36.

Figure 23:
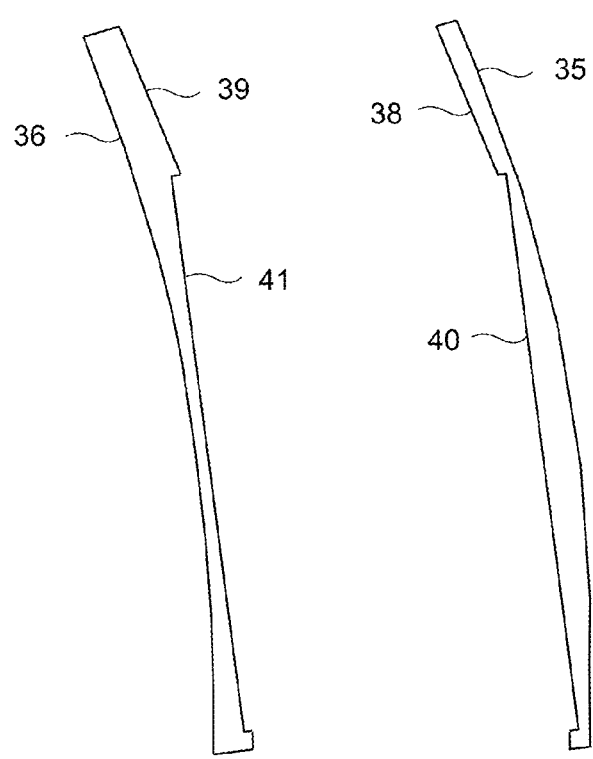
FIG. 23 is a variant of the two partial bodies according to FIG. 20.

In the modification according to FIG. 23, both partial bodies 35 and 36 in each case comprise a recess 40, 41 which are formed together such that the guide plate 14 can be inserted in between and the boundary surfaces 38 and 39 are still in direct contact with each other in the areas next to the recesses 40, 41.

As is shown in the representations from FIGS. 19 to 23, the guide plate 14 is almost buried in the first and/or second partial body 35, 36. The guide plate 14 is always completely enclosed by the two partial bodies 35, 36. This leads to the first and/or second side 18, 19 and thus the first and/or second reflecting surface being arranged spaced apart from the corresponding boundary surface 38, 39.

Figure 24:
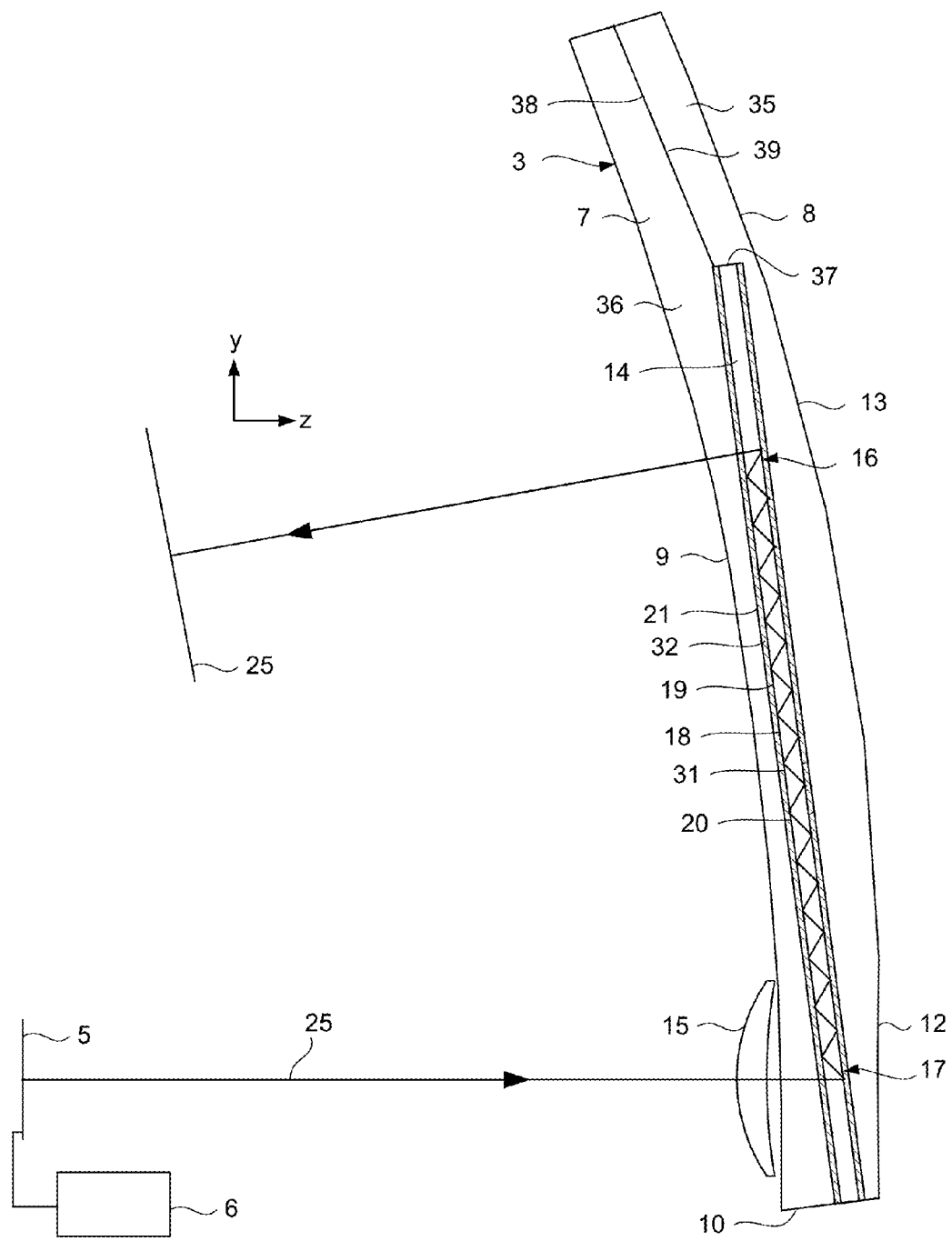
FIG. 24 is a sectional view of the right-hand spectacle lens according to a further embodiment.

In the development shown in FIG. 24, the recess 37 is formed in the first partial body 35 such that it runs up to the end face 10. Of course, the guide plate is adapted accordingly and then also extends up to the end face 10.

In a modification which is not shown, the guide plate can, of course, also extend beyond the end face 10 (comparable with the embodiment according to FIG. 17).

Furthermore, in the embodiments according to FIGS. 19 to 24, the image can be guided between the second and first deflecting sections 17, 16 by means of total internal reflection. Alternatively, a corresponding reflective (or partially reflective) layer 31, 32 can be provided. This reflective or partially reflective layer 31, 32 can be formed directly on the guide plate 14 and/or on the corresponding areas of the two boundary surfaces 38 and 39 (in particular in the area of the recess 37, 40, 41).

In the embodiments according to FIGS. 19 to 24 described hitherto, the plane-parallel guide plate 14 was always used, which, on the first side 18, comprises the facets 27, 26 in the first and second deflecting section 16, 17. However, it is also possible to form the second deflecting section 17 with refractive facets which are formed on the second side 19.

Figure 25:
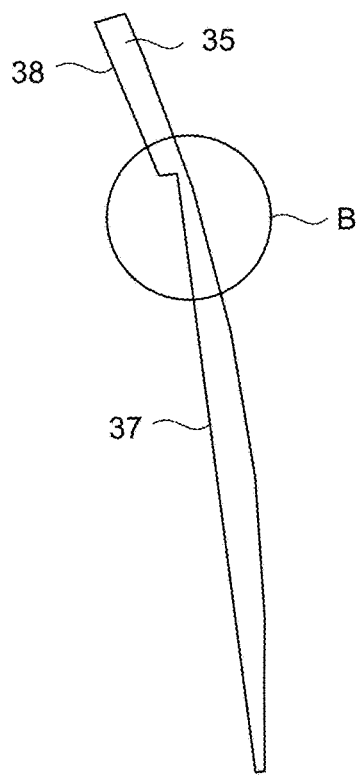
FIG. 25 is a view of the partial body of the embodiment from FIG. 25.

Furthermore, it is possible to dispense with the separate guide plate 14 and, for example, to form the necessary facets directly in the recess 37 of the first partial body 35. To describe the necessary production steps, the first partial body 35 of the spectacle lens 3 of FIG. 24 is represented in FIG. 25. In order now to form the necessary facets 27 in the first deflecting section 17 (indicated by the circle B), the following procedure can be used.

Figure 26:
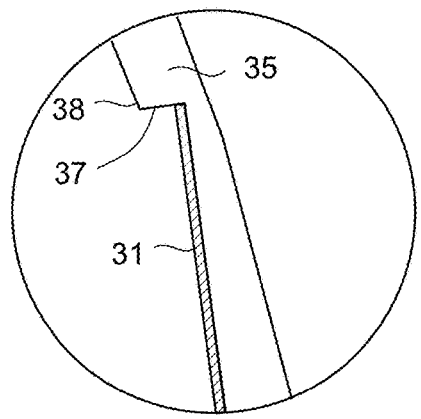
FIG. 26 is an enlarged view of the detail B from FIG. 25 to explain the production of the spectacle lens according to the invention.

Firstly, a corresponding reflective layer 31 is applied in the recess 37, as is shown in the enlarged detailed view of detail B in FIG. 26.

Figure 27:
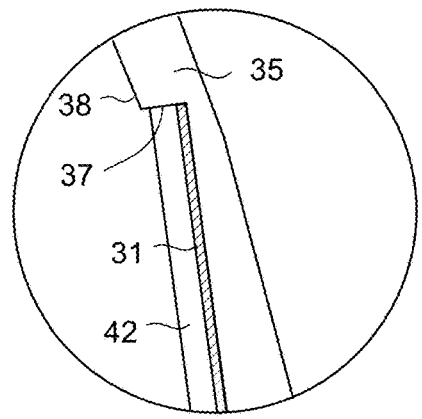
FIG. 27 is an enlarged view of the detail B from FIG. 25 to explain the production of the spectacle lens according to the invention.

A transparent layer 42 is applied to this reflective layer 31 (FIG. 27). The transparent layer 42 is preferably formed from the same material as the first partial body 35.

Figure 28:
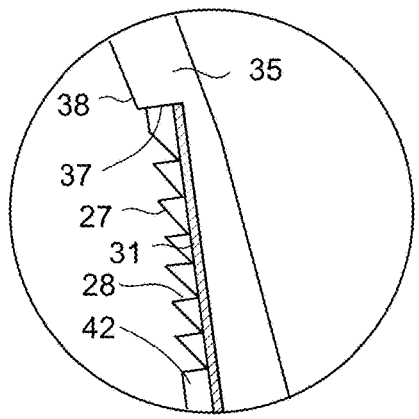
FIG. 28 is an enlarged view of the detail B from FIG. 25 to explain the production of the spectacle lens according to the invention.

The shape of the partially reflective facets 27 is formed in the transparent layer 42 (for example using a stamping process) and the facets 27 are then selectively (the faces 28 are not coated) provided with the desired partially reflective coating (FIG. 28).

The reflective facets 26 for the second deflecting section 17 can, in principle, be produced in the same way. Here, however, the reflective layer 31 can be dispensed with. Therefore, the facets 26 can be formed directly in the recess 37. Alternatively, it is possible to form them on the transparent layer 42. The facets 26 can be provided with a partially reflective or a reflective (where possible 100% reflection) coating.

The second partial body 36 is provided with the reflective layer in the area lying opposite the recess 37 (not shown).

The first partial body 35 is then connected to the second partial body 36, with the result that a cavity is present because of the recess 37. This is filled with transparent material, which is preferably the same material as that of the first and second partial body 35 and 36.

The recess 37 can also be filled before the two partial bodies 35 and 36 are connected. In this case, in a modification, the reflective layer can also be formed on the filling of the recess 37 instead of on the second partial body 36.

Of course, the described embodiments and features thereof can (as far as is meaningful) also be combined with each other.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for a display device that can be fitted on the head of a user and generate an image, comprising:
    a spectacle lens body comprising a front side and a rear side, wherein at least one of the front side and the rear side are curved, at least a first and a second partial body, the mutually facing boundary surfaces of which are in direct contact, and as seen in top view onto the spectacle lens, a coupling-in section in an edge area of the spectacle lens and a coupling-out section in a central area of the spectacle lens,
    wherein the spectacle lens is configured to guide light bundles of pixels of the generated image, which are coupled into the spectacle lens via the coupling-in section of the spectacle lens, in the spectacle lens to the coupling-out section and coupling them out of the spectacle lens via the coupling-out section,
    wherein a flat first reflecting surface and a flat second reflecting surface spaced apart from the first reflecting surface are provided in the spectacle lens body, which each extend in a direction from the coupling-in section to the coupling-out section and which are each spaced apart from the front and rear side of the spectacle lens body,
    wherein the light bundles are guided by reflections at the two reflecting surfaces in the direction from the coupling-in section to the coupling-out section, and
    wherein at least one of the first and second reflecting surfaces is provided in the first or second partial body and is offset from the boundary surface of the corresponding partial body in the direction from the first to the second partial body.

2. The spectacle lens according to claim 1, wherein the first reflecting surface is provided in the first partial body and spaced apart from the boundary surface of the first partial body and the second reflecting surface is provided in the second partial body and spaced apart from the boundary surface of the second partial body.

3. The spectacle lens according to claim 1, wherein the first reflecting surface is provided in the first partial body and spaced apart from the boundary surface of the first partial body and the second reflecting surface is formed at the boundary surface of the second partial body.

4. The spectacle lens according to claim 1, wherein the coupling-out section comprises a pupil expander for the light bundles.

5. The spectacle lens according to claim 1, wherein the first and second reflecting surfaces are parallel to each other.

6. The spectacle lens according to claim 1, wherein, in the coupling-out section, a first deflecting section is formed with a reflective Fresnel structure which deflects the light bundles in the direction of the rear side such that they are coupled out via the rear side.

7. The spectacle lens according to claim 6, wherein the second reflecting surface extends into the coupling-out area and the Fresnel structure lies in front of the second reflecting surface, seen in the direction of the light bundles striking the second reflecting surface.

8. The spectacle lens according to claim 6, wherein the Fresnel structure comprises several reflective facets which are arranged next to each other in a direction from the edge area to the central area.

9. The spectacle lens according to claim 8, wherein the facets are formed as partially reflective facets.

10. The spectacle lens according to claim 8, wherein the transparency of the facets decreases in the direction from the edge area to the central area.

11. The spectacle lens according to claim 8, wherein, in each case, two directly neighboring facets are connected by a transparent face.

12. The spectacle lens according to claim 8, wherein the first reflecting surface extends into the coupling-out area and the Fresnel structure lies in front of the first reflecting surface, seen in the direction of the light bundles striking the first reflecting surface.

13. The spectacle lens according to claim 12, wherein the facets are formed on the first reflecting surface and the area between the facets and the first reflecting surface is filled with a material which corresponds to the material of the partial body in which the first reflecting surface lies.

14. The spectacle lens according to claim 1, wherein the first and second reflecting surfaces are formed by boundary surfaces of a guide plate which is inserted in at least one of the first and the second partial body.

15. The spectacle lens according to claim 14, wherein the guide plate projects laterally from the spectacle lens body, wherein the coupling-in section is formed in the laterally projecting part of the guide plate.

16. The spectacle lens according to claim 1, wherein at least one of the first and the second reflecting surface is formed in at least one of the first and the second partial body.

17. The spectacle lens according to claim 1, wherein at least one of the first and the second reflecting surface brings about the reflection of the light bundles by total internal reflection.

18. The spectacle lens according to claim 1, wherein at least one of the first and the second reflecting surfaces are formed by a reflecting layer.

19. The spectacle lens according to claim 1, wherein a second deflecting section, which deflects the light bundles such that they are guided to the coupling-out section by the reflections at the first and second reflecting surface, is provided in the area of the coupling-in section.

20. The spectacle lens according to claim 1, wherein at least one of the coupling-in and the coupling-out sections has an imaging effect.

21. The spectacle lens according to claim 1, wherein the coupling-in section has a collimation effect.

22. The spectacle lens according to claim 1, wherein the coupling-in section is at least one of refractive and reflective.

23. A display device, comprising:
a holder that can be fitted on the head of a user;
an image-generating module secured to the holder, which generates an image; and
an imaging optical system secured to the holder, which comprises a spectacle lens according to claim 1 and which, when the holder is fitted on the head, images the generated image such that the user can perceive it as a virtual image.

24. A spectacle lens for a display device that can be fitted on the head of a user and generate an image, comprising:
a spectacle lens body comprising a front side and a rear side, wherein at least one of the front side and the rear side are curved and the spectacle lens body is formed in one piece, and as seen in top view onto the spectacle lens, a coupling-in section in an edge area of the spectacle lens and a coupling-out section in a central area of the spectacle lens,
wherein the spectacle lens is configured to guide light bundles of pixels of the generated image, which are coupled into the spectacle lens via the coupling-in section of the spectacle lens, in the spectacle lens to the coupling-out section and coupling the light bundles out of the spectacle lens via the coupling-out section,
wherein a flat first reflecting surface and a flat second reflecting surface spaced apart from the first reflecting surface are provided in the spectacle lens body, which each extend in a direction from the coupling-in section to the coupling-out section and which are each spaced apart from the front and rear side of the spectacle lens body,
wherein the light bundles are guided by means of reflections at the two reflecting surfaces in the direction from the coupling-in section to the coupling-out section,
wherein the first and second reflecting surfaces are formed by boundary surfaces of a guide plate which is inserted into the spectacle lens body, and
wherein the guide plate, in the coupling-out section, comprises a first deflecting section with a reflective Fresnel structure, which deflects the light bundles in a direction of the rear side such that they are coupled out via the rear side.

25. The spectacle lens according to claim 24, wherein the guide plate projects laterally from the spectacle lens body, wherein the coupling-in section is formed in the projecting part of the guide plate.

26. The spectacle lens according to claim 24, wherein the spectacle lens body comprises an end face which connects the front and rear sides and from which a recess extends into the spectacle lens body, wherein the guide plate is positioned in the recess.

27. The spectacle lens according to claim 24, wherein the Fresnel structure comprises several reflective facets which are arranged next to each other in a direction from the edge area to the central area.

28. The spectacle lens according to claim 27, wherein the facets are formed as partially reflective facets.

29. The spectacle lens according to claim 28, wherein the transparency of the partially reflective facets decreases in the direction from the edge area to the central area.

30. The spectacle lens according to claim 27, wherein each of two directly neighboring facets are connected by a transparent face.

31. The spectacle lens according to claim 27, wherein an area between the facets and the first reflecting surface is filled with material of the guide plate such that the first reflecting surface is formed as a smooth surface in the area of the facets.

32. A spectacle lens for a display device that can be fitted on the head of a user and generate an image, comprising:
- a spectacle lens body comprising a front side and a rear side, wherein at least one of the front side and the rear side are curved and the spectacle lens body is formed in one piece, and as seen in top view onto the spectacle lens, a coupling-in section in an edge area of the spectacle lens and a coupling-out section in a central area of the spectacle lens,
- wherein the spectacle lens is configured to guide light bundles of pixels of the generated image, which are coupled into the spectacle lens via the coupling-in section of the spectacle lens, in the spectacle lens to the coupling-out section and coupling the light bundles out of the spectacle lens via the coupling-out section,
- wherein a flat first reflecting surface and a flat second reflecting surface spaced apart from the first reflecting surface are provided in the spectacle lens body, which each extend in a direction from the coupling-in section to the coupling-out section and which are each spaced apart from the front and rear side of the spectacle lens body, and
- wherein the light bundles are guided by means of reflections at the first and second reflecting surfaces in the direction from the coupling-in section to the coupling-out section, and
- wherein at least one of the first and second reflecting surfaces is configured to bring about the reflection of the light bundles via total internal reflection.

* * * * *